United States Patent [19]

Lonneman

[11] Patent Number: 5,545,315

[45] Date of Patent: Aug. 13, 1996

[54] WATER FILTERING AND PURIFYING APPARATUS

[75] Inventor: Alan Lonneman, Plymouth, Minn.

[73] Assignee: WTC Industries, Inc., Plymouth, Minn.

[21] Appl. No.: 286,774

[22] Filed: Aug. 5, 1994

[51] Int. Cl.[6] ........................ C02F 9/00
[52] U.S. Cl. ............... 210/120; 210/136; 210/266; 210/275; 210/282
[58] Field of Search ................ 210/120, 136, 210/266, 282, 274, 275

[56] References Cited

U.S. PATENT DOCUMENTS

| | | | |
|---|---|---|---|
| 2,738,105 | 3/1956 | Wolfer et al. | 210/120 |
| 3,327,859 | 6/1967 | Pall | 210/266 |
| 3,734,098 | 5/1973 | Schneller et al. | 128/272 |
| 4,522,719 | 6/1985 | Kuwajima et al. | 210/457 |
| 4,595,500 | 6/1986 | Galbiati | 210/266 |
| 4,995,976 | 2/1991 | Vermes et al. | 210/266 |
| 5,045,195 | 9/1991 | Spangrud et al. | 210/266 |
| 5,156,335 | 10/1992 | Smith et al. | 239/33 |
| 5,160,038 | 11/1992 | Harada et al. | 210/149 |
| 5,167,819 | 12/1992 | Iana et al. | 210/474 |
| 5,211,973 | 5/1993 | Nohren, Jr. | 426/82 |
| 5,273,649 | 12/1993 | Magnusson et al. | 210/232 |

Primary Examiner—Ivars Cintins
Attorney, Agent, or Firm—Kinney & Lange

[57] ABSTRACT

A water filtering and purifying apparatus made according to the present invention comprises a water filtering and purifying apparatus for filtering and purifying water as it is ejected from a container at low gauge pressures generated by manually squeezing the container. The water filtering apparatus includes a cover for attaching to the container wherein the cover has a pressure responsive venting system for allowing air into the container while substantially preventing air and water contained in the container from escaping. A water filtration and purifying system is contained within the container and the filtration and purifying system comprises a replaceable pleated filter connected to a purifying cartridge.

17 Claims, 4 Drawing Sheets

5,545,315

WATER FILTERING AND PURIFYING APPARATUS

BACKGROUND OF THE INVENTION

The present invention relates to a water filtering and purifying apparatus. In particular, the present invention relates to a container having a water filtration and purifying system therein which operates at low pressures generated by manually squeezing the container.

Water filtration or purification systems are not new. Many large scale purifying systems have been developed in an attempt to combat the impurities, contaminants, and chemicals appearing to some degree, sometimes substantial, in most sources of drinking water. However, one does not always have access to water purified by a large scale purifier. Portable water filters and purifiers have been developed to allow a user to obtain clean water wherever that user may go. Many portable water purifiers include a granular activated carbon (GAC) filtration section in combination with an iodine resin purification system, a filtered inlet, and a straw-like mouth piece through which the water must be sucked. Such purifiers have been disclosed in U.S. Pat. No. 4,298,475 and U.S. Pat. No. 4,995,976. A problem with these purifiers is that a user must exert a rather large sucking action to the straw to achieve flow through the GAC and the iodine resin, and a light headed condition may often result.

Pumping systems which use replaceable filters share a common problem in many instances of having to replace the filters often. In such pumping systems, debris from the pumped liquid, typically water, is trapped in the filter and rapidly clogs the filter, making it necessary that the filter be replaced.

Cartridge based water filtration and purifying systems are also known in the art. Magnusson, U.S. Pat. No. 5,273,649 discloses a disposable cartridge based water filtration device. Magnusson discloses a container having a filtration device therein. The filtration device in Magnusson has a common problem that many filtration devices in containers have, that is, it takes a full squeeze of the container to get liquid up to the nozzle, with very little water being ejected from the nozzle. Releasing the container from that squeeze before squeezing again reduces the pressure in the container below atmosphere causing the liquid in the nozzle to flow back into the container, thus forcing liquid back out of filtration device. This sequence of events is repeated with each squeeze and release of the container with very little water coming from the nozzle, making drinking very tiresome.

SUMMARY OF THE INVENTION

The present invention provides a water filtering and purifying apparatus housed in a container for filtering and purifying water at low gauge pressures generated by manually squeezing the container. The container is a flexibly resilient container commonly known as a sport bottle. The container has a cover which has a pressure responsive venting system for allowing air into the container while substantially preventing air and water contained in the container from escaping. A water filtration and purifying system is contained within the container, and the filtration and purifying system is comprised of a replaceable pleated filter connected to a purifying cartridge.

DETAILED DESCRIPTION OF THE PREFERRED EMBODIMENTS

Figure 1:
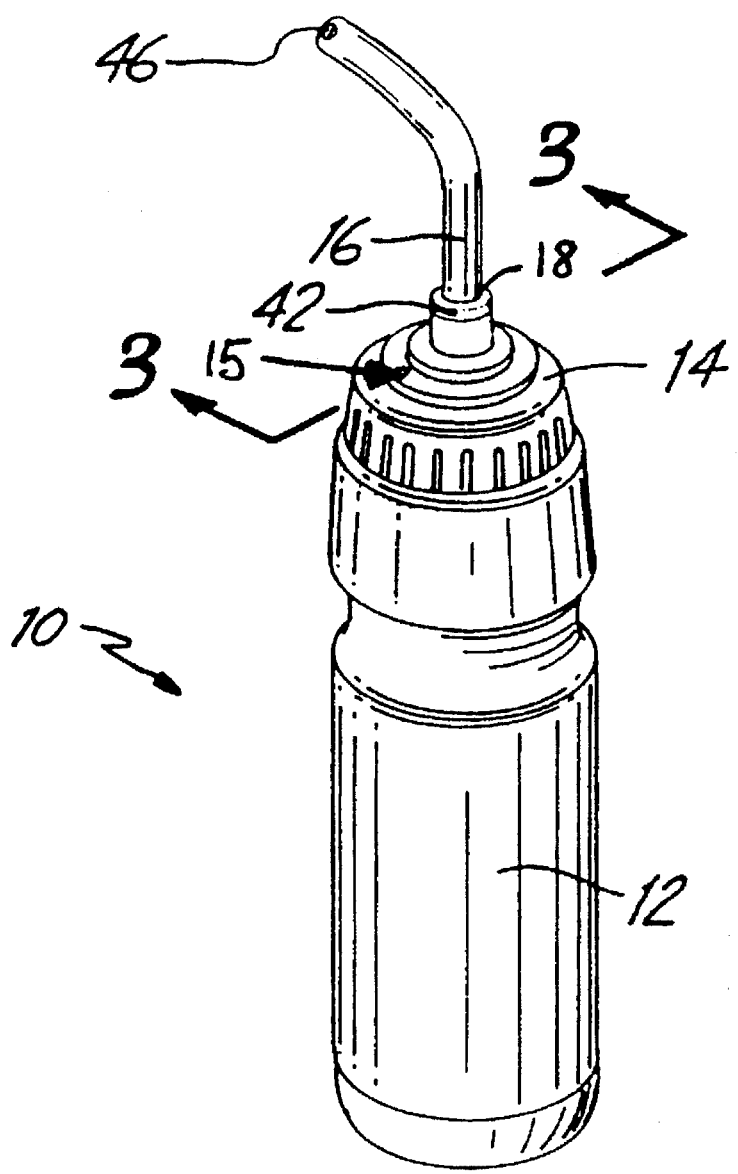
FIG. 1 is a perspective view of a flexible walled container of the present invention.

A water filtering and purifying apparatus 10 is shown generally in FIG. 1. A flexibly resilient thin walled container 12 is illustrated to which a cover 14 is removably attached. The cover contains a pressure responsive venting system 15, which will be described in greater detail below. The cover 14 has an orifice 18, from which protrudes a polymer material nozzle 16. The container illustrated in FIG. 1 and used in the preferred embodiment is the type of bottle commonly known as a sport bottle formed of a flexible polymer material that is quite resilient, but it should be understood that any such flexibly resilient walled container may be used. The container 12 in the preferred embodiment holds approximately 0.5 liters of water, but again, it should be understood that a larger or smaller container may be used.

Figure 2:
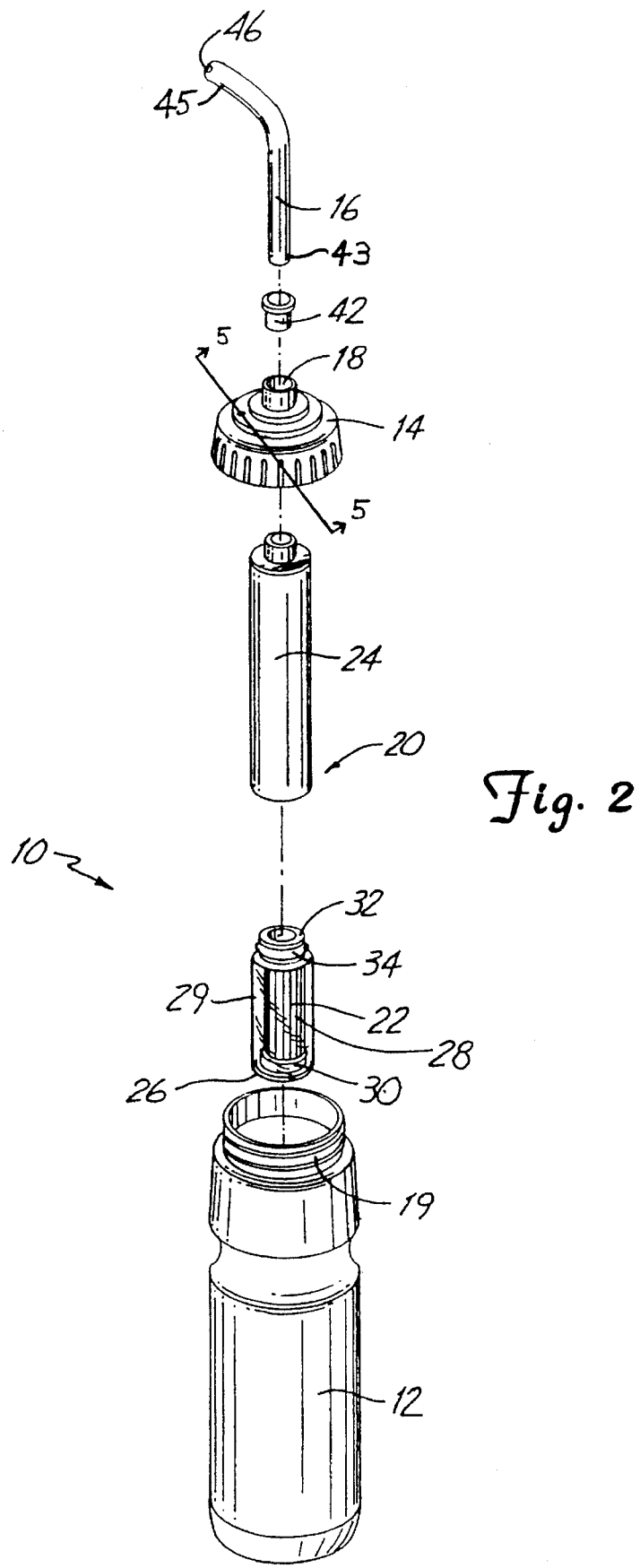
FIG. 2 is an exploded perspective view of a filtering apparatus of the present invention.

FIG. 2 is an exploded perspective view of the water filtering and purifying apparatus of FIG. 1. As can be seen in FIG. 2, the container 12 contains threads 19 for releasably attaching the cover 14. Contained inside the container 12 is a filtration and purifying system shown generally at 20. The filtration and purifying system 20 comprises a replaceable filter portion 22 and a purifying cartridge 24. The replaceable filter portion 22 comprises a filter housing 26, a pleated filter 28 which will be described in greater detail below, an end cap 30 attached to the end of the pleated filter 28 and a neck 32. A channel space 29 having the shape of a cylindrical shell is formed between the outer edge of the pleated filter 28 and the filter housing 26. Surrounding the neck 32 is an o-ring 34 which is used to tightly seal the replaceable filter portion 22 to the purifying cartridge 24. The housing 26 acts as a tube to conduct water from the bottom of the container 12 into the cartridge 24 and also as a protector to prevent damage to the pleated filter 28 and the end cap 30. The filter housing 26 in the preferred embodiment is made of a flexible polypropylene material.

Figure 3:
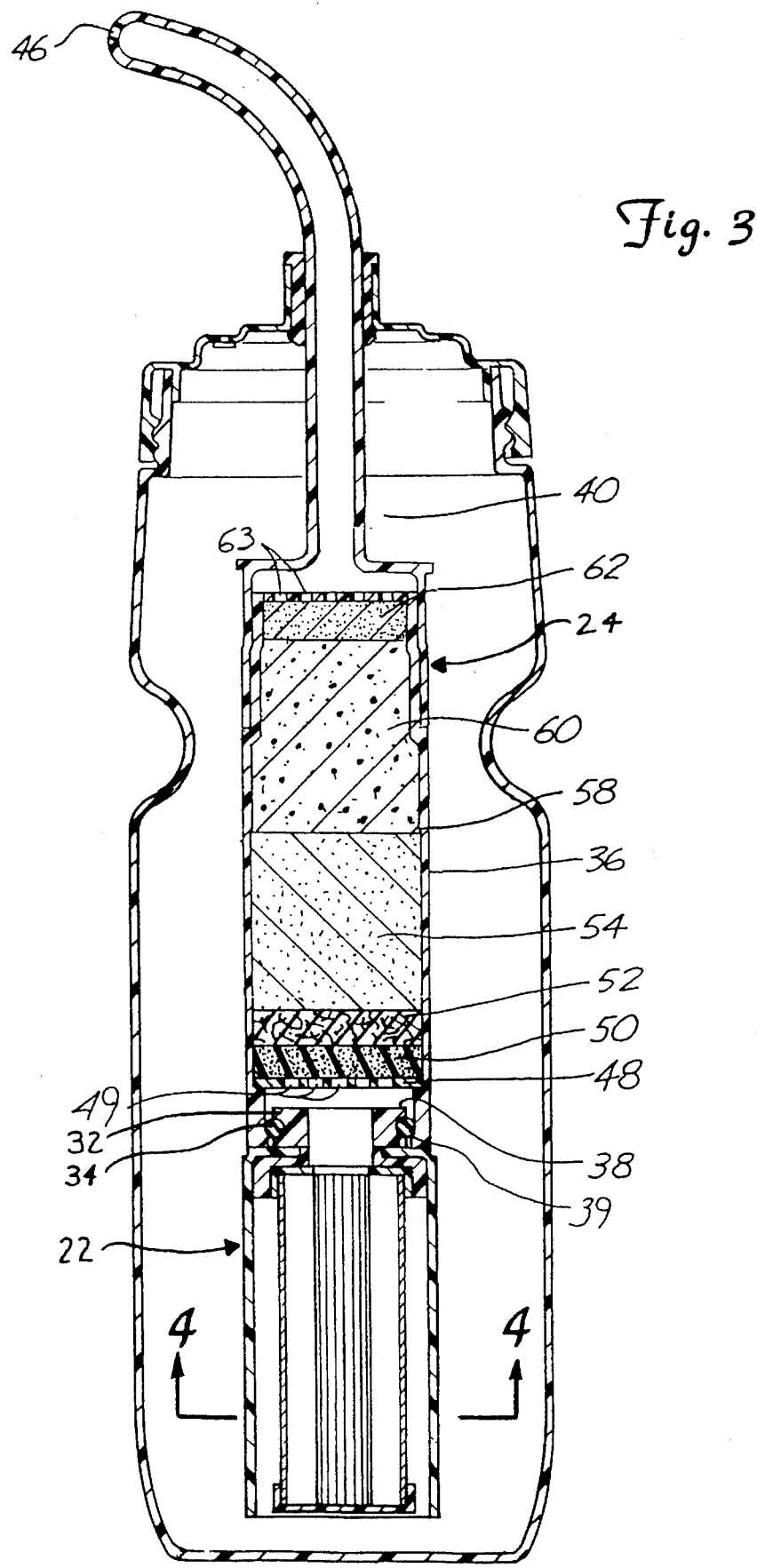
FIG. 3 is an enlarged sectional view taken along line 3—3 of FIG. 1.

As can be seen in FIG. 2, the nozzle 16 has a polymer material adapter 42 sized to fit over a first end 43 of the nozzle 16. The adapter 42 is sized to removably fit into the orifice 18 of the cover 14. In an alternative embodiment, as illustrated in FIG. 3, the adapter may be molded with and be part of the cover 14. A second end 45 of the nozzle 16 has a flow restriction outlet hole 46 sized to achieve a desired flow rate, as will be described in detail below, and is curved to point substantially away from the longitudinal axis of the container 12.

FIG. 3 is a sectional view taken along line 3—3 of FIG. 1, illustrating the interior of the filtration and purifying system. The purifying cartridge 24 comprises a cartridge housing 36 and a receiving cavity 38. The receiving cavity 38 is sized to receive the neck 32 and o-ring 34 of the replaceable filter portion 22, such that the o-ring forms a tight seal with the receiving cavity 38. The receiving cavity 38 contains a retaining lip 39 that the o-ring 34 must slid over upon insertion of the neck 32 into the receiving cavity 38. The retaining lip 39 secures the filter 22 onto the cartridge 24.

The cartridge 24 contains a holey disc 48 having a plurality of holes 49 therethrough to permit water to flow through and the disc 48 is positioned adjacent the receiving cavity 38. A carbon impregnated foam pad 50, used as an absorber, is positioned next to and is held in place by the holey disc 48. A first wad of fibrous material 52 for packing is positioned next to the foam pad 50. The fibrous material in the present invention is a spun polyethylene.

A purification resin 54 is the next element in the cartridge 24. Approximately 19–21 milliliters of resin is used in the preferred embodiment. This amount was chosen because based on the size of the container 12, it takes water a sufficient amount of time to travel through the 19–21 milliliters of resin 54 thus allowing the resin to neutralize all bacteria and viruses in a known manner. The purification resin used in the preferred embodiment is a halogenated resin such as tri-iodide or penta-iodide. The carbon impregnated pad 50 absorbs may sublimated iodine that, if not absorbed, tends to condense on the plastic of the container 12, thus turning the container yellow. Water causes the purification resin 54 to expand. The first wad of fibrous material 52 used for packing tends to act as a spring, due to its resiliency, to absorb the expansion of the resin 54. This springing effect allows the resin 54 to expand while keeping the resin tightly packed in the cartridge when not wet. A polymer material separator 58 is positioned next to the resin 54.

A granulated carbon stage 60 is the next stage of the purifying cartridge 24. Granulated carbon filters are common in water purification to remove odors, harmful organic compounds and heavy metals contained in the water. These substances are collected on the surface of the carbon pores. The granulated carbon used in the preferred embodiment is a washed coconut shell charcoal. This type is used because it gives off less fines than anthracite based carbon. Next to the carbon stage 60 is a second wad of fibrous material 62 for packing.

Figure 4:
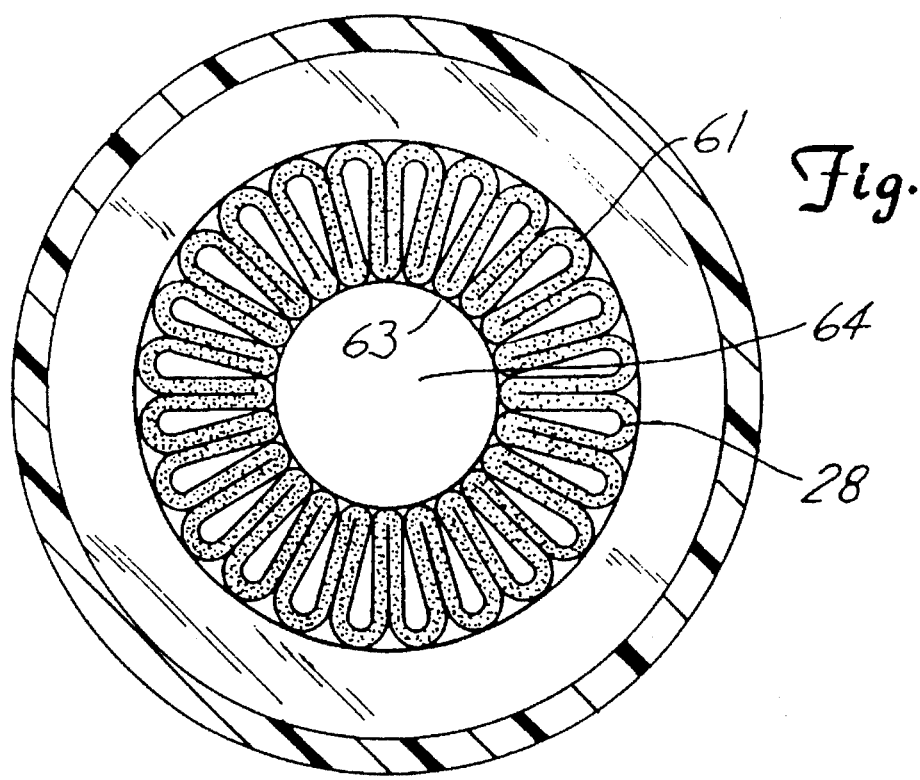
FIG. 4 is a sectional view taken along like 4—4 of FIG. 3.

FIG. 4 is a sectional view of the pleated filter 28 taken along line 4—4 of FIG. 3. As illustrated in FIG. 4, the pleated filter 28 is a corrugated walled tube with an average thickness locus that is circular in cross section and has a outer corrugated edges 61 and inner corrugated edges 63 which surrounds a central channel 64 of the filter. By using a pleated filter, the surface area of the filter is dramatically increased which allows more fluid to pass through the filter than with a traditional non-pleated filter. This allows the filter to achieve adequate liquid flow therethrough at lower pressures. The pleated filter 28 is made of a highly hydrophilic material to enhance the flow through the filter. The filter medium used in the preferred embodiment is a borosilicate glass microfiber media with an acrylic resin binder, but any suitable highly hydrophilic material would work. By using a highly hydrophilic material for the filter, fluid is wicked to portions of the filter not currently under the high fluid level line in the container. This too adds to the enhanced flow rate.

Figure 5:
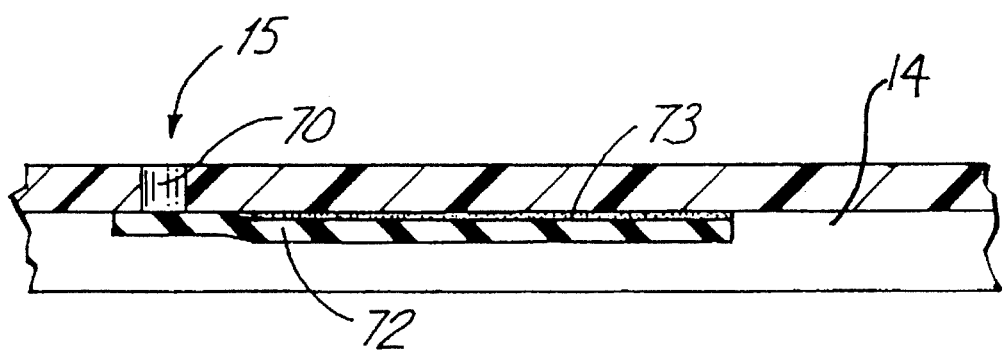
FIG. 5 is an enlarged sectional view taken along line 5—5 of FIG. 2.

FIG. 5 is an enlarged sectional view taken along line 5—5 of FIG. 2. FIG. 5 illustrates the pressure responsive venting system 15 in detail. The venting system 15 comprises a vent hole 70 through the cover 14, a flapper 72 affixed to the inside portion of the cover 14 adjacent the vent hole 70, and adhesive 73. In the preferred embodiment the flapper 72 is made of rubber approximately 18/1000 of an inch thick, but other materials impermeable to air and water may also be used and is secured to the inside of the cover 14 with a commonly known adhesive. The thickness of the flapper 72, causes it to be somewhat resilient, such that in its relaxed, or normal position, the flapper is substantially horizontal covering the hole 70. Because the flapper 72 is not preloaded in any way, and there is no other attractive force acting to maintain the flapper in close contact with the cover 14, it is possible for contaminants or air or water to enter into the container 12 through the vent hole 70. The flapper is attached to the inside of the cover 14 such that the venting system 15 automatically opens when the pressure in the container 12 is below atmosphere so air is to be drawn into the container 12, as will be described below, and closes due to the resiliency of the flapper 72 when the pressure in the container 12 has again reached the atmospheric level.

In operation, the cover 14 is removed from the container to allow the container to be filled with water. After the cover 14 has been replaced, when water is desired from the container 12, the person using the container squeezes the container, thus changing the volume of the container, and consequently creating a positive gauge pressure therein. Due to the increased pressure in the container, water is forced to enter the replaceable filter portion 22 at the bottom edge of the filter housing 26 and move up into the channel space 29. From the channel space 29, water passes radially through the pleated filter 28 into the center channel 64. Once through the pleated filter 28, the water is forced through the holes 49 of the holey disk 48 and into the carbon impregnated foam pad 50. From there, the water is forced through the first wad of spun poly 52 into the purification resin 54 where any bacteria or viruses contained in the water are disabled.

From the purification resin 54, the water is then forced into the carbon filter stage 60. While in the carbon filter stage, odor sources, harmful organic compounds and heavy metals remaining in the water are reduced. From the carbon filter stage 60, the water is forced through the second wad of poly 62 and out of the cartridge 24 into the nozzle 16.

Before leaving the nozzle 16, the water must first pass through the flow restriction hole 46. In the preferred embodiment, the flow restriction hole 46 has a diameter of 0.092 inches. This specific diameter was chosen to restrict the flow of water through the cartridge to 500 milliliters per minute. This flow rate was chosen because at this rate the water will remain in the approximately 19–21 milliliters of resin 54 long enough to neutralize all the bacteria and viruses in the water. It should be understood that different nozzle sizes and flow rates may be chosen without departing from the spirit of the invention.

As previously stated, the container used in the preferred embodiment typically has a volume of 0.5 liters. A typical squeeze reduces the volume of the container approximately 0.03 liters. The filtration and purifying system 20 holds approximately 0.03 liters of water, thus, the initial squeeze serves to prime the filtration and purifying system 20 with water, but does not typically eject water out of the nozzle. Upon releasing the container 12, the container 12 begins to expand to its original shape. As the container 12 expands to its original shape, a negative gauge pressure begins to build inside the container. This negative pressure draws open the flapper 72 which in turn allows air to enter into the container 12.

The veto hole 70 is optimally sized to cause a slight backwashing effect in the filtration and purifying system 20. A backwash effect is caused because the amount of negative gauge pressure created during the expansion in the container 12 is not entirely equalized by the amount of air allowed in through the vent hole 70, thus causing a small amount of air to be drawn in through the nozzle 16 which in turn causes a slight back wash of water through the filtration and purifying system 20. This slight back wash causes water to be expunged from the system out through the pleated filter 28, which tends to loosen and eject foreign particles that have been trapped by the pleated filter 28. Because these materials are continuously being released by the back wash, the pleated filter 28 has a much longer life than replaceable filters that are not back washed. The size of the vent hole 70 in the preferred embodiment is approximately 70/1000 of an inch in diameter, which was chosen to achieve the optimal amount of backwash. If more of a backwash is desired, the size of the vent hole 70 can be reduced, or if less of a backwash is desired the size of the vent hole 70 can be increased. By only allowing a slight backwash, most of the water remains inside the filtering and purifying system 20 and does not all drain out. Thus, on subsequent squeezes of the container 12, the filtration and purifying system 20 is already primed and small squeezes of the container produce corresponding streams of water from the nozzle 16.

The configuration of the container in the present invention is not critical. It would be possible to use a disposable container having a water supply valve instead of a removable cover without departing from the scope of the invention. It would also be possible to use a purifying cartridge other than the one described herein without departing from the scope of the invention.

The configuration of the pressure responsive venting system 15 is also not critical. Any type of pressure responsive venting system would work without departing from the scope of the invention including a ball and spring, a stem and spring and a diaphragm type valve.

Although the present invention has been described with reference to preferred embodiments, workers skilled in the art will recognize that changes may be made in form and detail without departing from the spirit and scope of the invention.

What is claimed is:

1. A water filtering apparatus comprising:
   a walled container having an interior and an exterior surface and a pressure responsive venting means for allowing air into the container while substantially preventing fluids contained in the container from escaping therefrom;
   supply means for allowing the container to be filled with water;
   a water filtration system contained within the container having a pleated filter portion and a filtration cartridge connected thereto; and
   an outlet tube connected to the filtration system and extending from the container to a point outside the container adjacent the exterior surface of the container, wherein the outlet tube contains a flow restricting device, the flow restricting device and the venting means sized to cause a predetermined back-wash through the filtration system when air enters the container.

2. The apparatus of claim 1 wherein the venting means comprises a flapper pivotally connected to the interior surface of the container adjacent a hole in the container.

3. The apparatus of claim 2 wherein the flapper is made of a liquid impermeable material.

4. The apparatus of claim 2 wherein the flapper is made of rubber.

5. The apparatus of claim 1 wherein the pleated filter is made of highly hydrophilic material.

6. The apparatus of claim 1 wherein the outlet tube has an outlet and wherein the tube is curved such that the outlet points substantially away from a longitudinal axis of the container.

7. A water filtering apparatus for filtering water at low pressures generated by manually squeezing a container, the apparatus comprising:
   a flexibly resilient walled container having an open end;
   a removable cover for covering the open end of the container wherein the cover has a pressure responsive venting means for allowing air into the container while substantially preventing fluids contained in the container from escaping therefrom;
   a water filtration system contained within the container, the filtration system comprising a replaceable pleated filter and a purification cartridge connected to the pleated filter; and
   an outlet tube, the outlet tube being connected to the filtration system and extending through the cover to a point outside the container, the outlet tube containing a flow restricting device, the flow restricting device and the venting means sized to cause a predetermined back-wash through the filtration system when air enters the container.

8. The apparatus of claim 7 wherein the venting means comprises a flapper pivotally connected to the cover adjacent a hole in the cover.

9. The apparatus of claim 8 wherein the flapper is made of a liquid impermeable material.

10. The apparatus of claim 8 wherein the flapper is made of rubber.

11. The apparatus of claim 7 wherein the pleated filter is made of highly hydrophilic material.

12. The apparatus of claim 7 wherein the outlet tube has an outlet and wherein the tube is curved such that the outlet points substantially away from a longitudinal axis of the container.

13. A water filtering apparatus for filtering water at low pressures generated by manually squeezing a container, the apparatus comprising:
   a flexibly resilient walled container having an open end;
   a removable cover for covering the open end of the container wherein the cover has a pressure responsive venting means for allowing air into the container while substantially preventing fluids contained in the container from escaping therefrom;
   a water filtration system contained within the container, the filtration system comprising:
      a replaceable pleated filter;
      a purification resin stage in fluid communication with and adjacent to the pleated filter;
      a carbon filter stage adjacent to and in fluid communication with the purification resin stage; and
      a plurality of separator means for separating the purification resin stage from the pleated filter and for separating the carbon filter stage from the purification stage;
   an outlet tube, the outlet tube connected to the filtration system and extending through the cover to a point outside the container; and
   a flow restricting device positioned within the outlet tube, the flow restricting device and the venting means sized to create a predetermined back-wash through the filtration system when air enters the container.

14. The apparatus of claim 13 wherein the venting means comprises a flapper pivotally connected to the cover adjacent a hole in the cover.

15. The apparatus of claim 13 wherein the pleated filter is made of highly hydrophilic material.

16. A water filtering apparatus for filtering water at low pressures generated by manually squeezing a container, the apparatus comprising:

a flexibly resilient walled container having an open end;

a removable cover for covering the open end of the container wherein the cover has a pressure responsive venting means for allowing air into the container while substantially preventing air contained in the container from escaping therefrom; and a water filtration system contained within the container, the filtration system having a replaceable pleated filter and a purification cartridge attached thereto, wherein the replaceable pleated filter has a neck and an o-ring seal thereon and wherein the purification cartridge contains a receiving means for receiving the neck and o-ring seal of the pleated filter, and wherein the receiving means has a retaining lip for securing the pleated filter therein.

17. A water filtering apparatus for filtering water at low pressures generated by manually squeezing a container, the apparatus comprising:

a flexibly resilient walled container having an open end;

a removable cover for covering the open end of the container wherein the cover has a pressure responsive venting means for allowing air into the container while substantially preventing fluids contained in the container from escaping therefrom; and a water filtration system contained within the container;

an outlet tube, the outlet tube connected to the filtration system and extending through the cover to a point outside the container; and a flow restricting device positioned within the outlet tube, the flow restricting device and the venting means sized to create a predetermined back-wash through the filtration system when air enters the container.

* * * * *

UNITED STATES PATENT AND TRADEMARK OFFICE
CERTIFICATE OF CORRECTION

PATENT NO. : 5,545,315

DATED : AUGUST 13, 1996

INVENTOR(S) : ALAN LONNEMAN

It is certified that error appears in the above-indentified patent and that said Letters Patent is hereby corrected as shown below:

Col. 4, line 62, delete "veto", insert --vent--

Signed and Sealed this

Seventeenth Day of December, 1996

BRUCE LEHMAN

*Attest:*

*Attesting Officer*     Commissioner of Patents and Trademarks